United States Patent
Thorne

(10) Patent No.: US 8,126,699 B2
(45) Date of Patent: Feb. 28, 2012

(54) PROCESS FOR TRANSLATING MACHINE SHORTHAND INTO TEXT

(76) Inventor: Jeremy Thorne, Port St. Lucie, FL (US)

(*) Notice: Subject to any disclaimer, the term of this patent is extended or adjusted under 35 U.S.C. 154(b) by 982 days.

(21) Appl. No.: 12/037,337

(22) Filed: Feb. 26, 2008

(65) Prior Publication Data

US 2008/0208564 A1    Aug. 28, 2008

Related U.S. Application Data

(60) Provisional application No. 60/903,690, filed on Feb. 26, 2007.

(51) Int. Cl.
*G06F 17/21* (2006.01)

(52) U.S. Cl. .......... 704/2; 704/9; 704/10; 704/231; 704/277; 715/257

(58) Field of Classification Search .......... 704/2, 9, 704/10, 231, 277; 715/257
See application file for complete search history.

(56) References Cited

U.S. PATENT DOCUMENTS

| | | | | | |
|---|---|---|---|---|---|
| 4,765,764 | A | * | 8/1988 | Lefler | 400/482 |
| 5,649,223 | A | * | 7/1997 | Freeman | 715/257 |
| 5,818,437 | A | * | 10/1998 | Grover et al. | 715/811 |
| 6,799,303 | B2 | * | 9/2004 | Blumberg | 715/257 |

OTHER PUBLICATIONS

Hodge et al., "A Comparison of Standard Spell Checking Algorithms and a Novel binary Neural Approach" IEEE Transactions on Knowledge and Data Engineering, vol. 15, No. 5. Sep./Oct. 2003.*
Kukich "Techniques for Automatically Correcting Words in Text" ACM Computing Surveys, vol. 24, No. 4, Dec. 1992.*

* cited by examiner

*Primary Examiner* — Vincent P Harper
(74) *Attorney, Agent, or Firm* — Mayback & Hoffman, P.A.; Gregory L. Mayback; Rebecca A. Tie

(57) ABSTRACT

A method for translating stenographic strokes includes the steps of receiving a series of stenographic strokes, creating a table of translations of one or more strokes within the series of strokes, sequentially assigning a score to each of the one or more strokes, determining at least one alternate translation to at least one of the translations in the table of translations, ranking the translations and alternate translations based on an accumulation of the score of the strokes within, and selecting one of the ranked translations or one of the ranked alternate translations based on a best score.

16 Claims, 1 Drawing Sheet

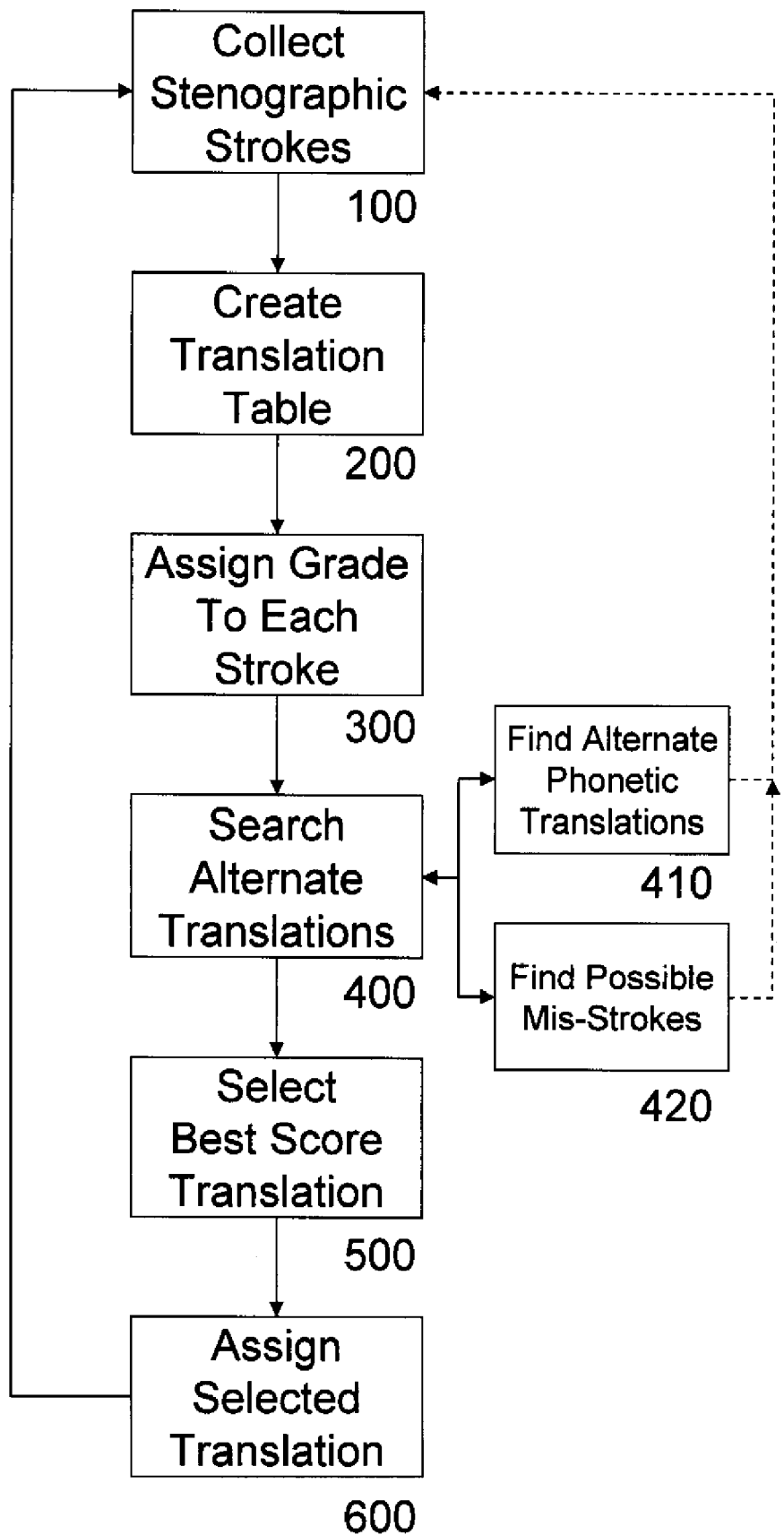

PROCESS FOR TRANSLATING MACHINE SHORTHAND INTO TEXT

CROSS-REFERENCE TO RELATED APPLICATION

This application claims the priority, under 35 U.S.C. §119, of U.S. Provisional Patent Application Ser. No. 60/903,690, filed Feb. 26, 2007, the entire disclosure of which is hereby incorporated herein by reference in its entirety.

STATEMENT REGARDING FEDERALLY SPONSORED RESEARCH OR DEVELOPMENT n/a

FIELD OF THE INVENTION

The present invention lies in the field of translation processes. More specifically, the present invention relates to processes for translating machine shorthand into text, in particular, English text.

BACKGROUND OF THE INVENTION

One exemplary general purpose spell-checking program is called ASpell, which is an open-source spelling checker created by Kevin Atkinson. This spelling checker simply checks for valid spellings and provides suggested alternates using a phonetic approximation algorithm. This program is used not only for word processing applications, but can also be used for stenographic spelling correction.

Computer-assisted Transcription (CAT) systems, in comparison, are specific to stenographic shorthand. A CAT program takes stenography that a reporter writes, searches the written characters within a steno-to-text dictionary that the reporter maintains, and places the resulting translated text in a document for later use by others. Stenography uses phonetics instead of spelling for translation into text (e.g., English text). It is known that many variations of a given spoken word exist and that the stenographer can type in any of these variations when trying to capture that spoken word. Because of the existence of the phonetic variations, errors occur often when translating from stenography. Errors arise because the stenographer's dictionary is organized merely as a look-up table; it is not able to make decisions about the typed-in entry, nor is it able to give a best match candidate or a set of best match candidates to the stenographer for use in the translated text.

Accordingly, it would be beneficial to provide a CAT system that is capable of making decisions to improve upon a straight translation from the dictionary.

SUMMARY OF THE INVENTION

The intelligent CAT system of the present invention takes the stenography that the reporter enters and looks up possible variations in a dynamically changing steno-to-text dictionary that the reporter maintains, and gives the stenographer an optimized "best match" that takes into account various factors. As the customized dictionary increases in size with use, the program evaluates many (even hundreds) of different options and chooses between these determined options. Traditional CAT system translation software only considers one option for a single sequence of stenographic strokes. The intelligent CAT system of the present invention, however, considers dozens or even hundreds of option for a single sequence of strokes and, therefore, is referred to by the inventor as "Translation Magic" or "TM" for short. The CAT system of the present invention is capable of making decisions that improves upon prior art straight translations from mere look-up dictionaries.

The CAT system of the present invention represents a leap forward in CAT technology and is an entirely new way of translating stenography to text, a process that is closer to the kind of adaptive pattern matching used by speech recognition engines than to the linear, inflexible translators used by traditional CAT software.

Primary functions of Translation Magic include phonetic translation, approximate dictionary searches, and comparative decision-making. Translation Magic can translate complex, multi-stroke words that are written phonetically, even if the word is not defined in the stenographer's own dictionary. Such translation is made possible based upon a relatively small table of phonetic rules for small sequences of keys, which is user definable, but which is pre-loaded with phonetic rules compatible with most stenographic theories. For example, if a stenographer writes the phrase:

TPAR PHA KOL TKPWAOE, this stenographic text will break that down into phonetic elements "far" "ma" "kol" and "gee." Translation Magic is able to identify that entry as the English word "pharmacology" and it will translate it accordingly.

Translation Magic can cope with an enormous number of variations in the ways that words can be written phonetically, whether in more strokes or in fewer strokes. Translation Magic can ignore doubled consonants that are used in some stenographic writing styles, such as "farm" "mak" "kol" "gee" and it can also ignore dropped vowel sounds, which are also common in some writing styles, such as "farm" "kol" "gee." If the user has already specified some short-form prefixes and suffixes in their phonetic table, such as OLG=ology, Translation Magic can use those in its translation. The shortest possible way a user could write the example of the word "pharmacology," is "TPARPL" "KOLG" (farm/kology). In traditional CAT systems, each possible variation would have to already be in the main dictionary in order for any of these variations to work. This characteristic is not present with Translation Magic.

Existing CAT systems have some way of phonetically translating individual strokes. However, the ability to combine these strokes together to create longer words, and the ability to sift through every possible spelling of these phonetic elements ("f" can be "f" or "ph," for example) to come up with the correct translation is not possible with prior art systems but is made possible by Translation Magic.

Most of the words that a stenographer translates will originate from their main dictionary, but some do not exist. TM, essentially, fills in the gaps of the dictionary by translating sequences of stenographic strokes for which there is no match in the dictionary. Thus, even where Translation Magic is able to phonetically translate a word that the stenographer has not yet defined in their dictionary, that translation will, nonetheless, occur. Translation Magic is able to phonetically translate a word that is not in the user's dictionary, but which is written perfectly. TM can also translate a mis-stroke for an entry that is contained within the user's dictionary, but which the user has written imperfectly. These two situations require very different functions.

Stenographers do not always write perfectly. For example, a stenographer might attempt to write the word "pharmacology" by using TPAR/PA/KOL/SKRAOE as the stenographic entry However, this entry is missing art "H" from the second stroke and a "W" from the fourth stroke. Because of the missing letters, the second stroke, phonetically, no longer represents "ma" and, instead, means "pa." Likewise, the fourth stroke no longer represents "gee" but, instead, is translated as "skree." Prior art CAT systems do not have any way to phonetically translate "pharmacology" out of "farpakolskree." This example shows that, in stenographic theory, one letter more or less can make a significant difference.

Translation Magic, however, is able to translate "pharmacology" from the "mess" of TPAR/PA/KOL/SKRAOE quite easily. TM enables the correct translation because, instead of insisting on an exact match between what the stenographer wrote and the entries in the stenographer's dictionary, TM looks for approximate matches. In performing the approximate match search, if a match is sufficiently close, TM will translate the entry even though mistakes were present therein. (At this point, it is noted that, sometimes, small variations like this example, are not actually mistakes but, rather, are alternative ways that the stenographer writes a particular word. More specifically, a stenographer might have a style where he/she intentionally writes an "a" instead of an "o" that is actually in the KOL stroke of the entry TPAR/PHA/KAL/ SKWRAOE.) This is an example of only one small change that Translation Magic can easily translate.

On the surface, the phonetic translation and approximate dictionary search functions might look trivial, however, it is not. This problem is complex because Translation Magic is required to decide when to use phonetics, when to use an approximate match in the dictionaries, and when to simply translate what the user wrote. This comparative decision making process is difficult and non-trivial. Stenography is written as a continuous stream. Nonetheless, Translation Magic is able to pick out sequences of strokes that should be processed in different ways by utilizing custom entries in a way that is weighted based upon common usage thereof. For example, the stenographer could have the following three dictionary entries:

PHEU=my
TOE=toe
SEUPB=sin

If the user writes PHEU/TOE/PHEU/SEUPB the software must be capable of recognizing that it is extremely likely that the desired translation is "mitomycin" and not "my toe my sin," even though the latter is a perfect translation according to the entries that have been defined in the dictionary as it exists. Likewise, if the user writes "He looked TPORTD defendant" (where TPORTD is not defined in the dictionary), Translation Magic is asked to decide between various possibilities:

"forted" (which is a perfect phonetic match for TPORTD); and
"for the" (which is defined in the dictionary as TPORT and the user may have accidentally hit the D key on the stenographic keyboard when this was transcribed).

Translation Magic is programmed to pick "for the" in this instance, even though "forted" is a better match, because "for the" is overwhelmingly more common and makes more sense in the context of the sentence. Thus, where a particular translation is more common in its use, that translation will be assigned a greater weight or "score" in the process of selecting which possible translation result should be chosen from a group of possible translations.

With the foregoing and other objects in view, there is provided, in accordance with the invention, a method for translating stenographic strokes includes the steps of receiving a series of stenographic strokes, creating a table of translations of one or more strokes within the series of strokes, sequentially assigning a score to each of the one or more strokes, determining at least one alternate translation to at least one of the translations in the table of translations, ranking the translations and alternate translations based on an accumulation of the score of the strokes within, and selecting one of the ranked translations or one of the ranked alternate translations based on a best score.

With the objects of the invention in view, there is also provided the step of locating words in a steno-to-text dictionary that correspond to the series of strokes.

With the objects of the invention in view, the assigning a score is according to a frequency of use and/or a contextual fit within a sentence.

With the objects of the invention in view, the determining alternate translations includes determining at least one phonetic profile of the series of strokes and locating at least one word in a steno-to-text dictionary that corresponds to the at least one phonetic profile.

With the objects of the invention in view, the at least one word located has a letter matching the first stroke of the received series of strokes.

In accordance with another feature of the invention, the method includes removing the selection from the series of strokes and repeating the creating step starting from a first of a series of remaining strokes.

In accordance with a further feature, the invention includes determining at least one phonetic variation of the individual stenographic strokes, determining all words in a steno-to-text dictionary that fit the variations for the sequence of stenographic strokes, comparing the determined words to contents of a stenographic phonetics table, and assigning a score to each comparison.

In accordance with an added feature of the invention, the determining alternate translations includes the steps of determining at least one way a single key could be one of added and taken away from a beginning of the series of stenographic strokes, searching for an indices of each of the determined at least one possible ways, creating an index of untouched entries, setting a maximum physical key distance N between dictionary entries to be examined, discarding each of the indices in the list that are within the distance N of one another, evaluating each non-discarded index that is within the distance N of one of the indices, creating a sequence of ranges that contain potential mis-strokes for the non-discarded index being evaluated, and determining an appropriateness of a match by counting a degree of error.

In accordance with an additional feature of the invention, the determining an appropriateness of a match includes assigning a first weight to keys accidentally pressed and unnecessary, assigning a second weight, greater than the first weight, to keys not pressed that should have been pressed, assigning the first weight to pressed keys that are relatively proximate a target key, and assigning the second weight to pressed keys that are relatively distant from the target key, wherein the first weight is more desirable than the second weight.

In accordance with yet another feature of the invention, there is provided a stenographic device including a plurality of keys operable to receive a series of stenographic strokes and a processor operable to create a table of translations of one or more strokes within the series of strokes, sequentially assign a score to each of the one or more strokes, determine at least one alternate translation to at least one of the translations in the table of translations, rank the translations and alternate translations based on an accumulation of the score of the strokes within, and select one of the ranked translations or one of the ranked alternate translations based on a best score.

Other features that are considered as characteristic for the invention are set forth in the appended claims.

Although the invention is illustrated and described herein as embodied in a process for translating machine shorthand into text, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

Advantages of embodiments of the present invention will be apparent from the following detailed description of the preferred embodiments thereof which description should be considered in conjunction with the accompanying drawing in which:

The FIGURE is a flow chart of an exemplary optimized translation process according to the invention.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. It must be noted that, as used in the specification and the appended claims, the singular forms "a," "an," and "the" include plural references unless the context clearly dictates otherwise.

While the specification concludes with claims defining the features of the invention that are regarded as novel, it is believed that the invention will be better understood from a consideration of the following description in conjunction with the drawing FIGURE.

The CAT system of the present invention, Translation Magic, is a process that starts by collecting a sequence of stenographic strokes and by creating a table of translations for these strokes by looking up what words are in the existing steno-to-text dictionaries for these specific strokes. Each of these strokes is assigned a grade in the sequence according to its frequency of use (information that is stored in the steno-to-text dictionary) and its contextual fit within a given sentence in which the strokes appears. Then, alternate translations (phonetics and approximate matches) are searched out where the alternate translations start with the first stroke in the transcribed sequence. The alternate translations are graded according to:

length;
 level of error
 frequency of use; and
 contextual fit.

The translation result with best score is selected, whether the result is the phonetic translation, the approximate match, or the exact match. The strokes translated from the beginning of the list of strokes are removed and more strokes are added to the end of the list, if necessary. Then, the process returns to the first step. For example, if the sequence started by analyzing A B C D E F, and if A B translated as "hello", the process goes back and starts again with C D E F as the beginning of the next sequence to translate.

Looking up every possible spelling variation of every possible phonetic element in a sequence of stenographic strokes takes a prohibitively long amount of time. The number of combinations for even a few stenographic keystrokes is in the millions, which could take minutes or hours to figure out each translated word. Accordingly, Translation Magic relies upon a special algorithm for phonetically looking up words. More specifically, the dictionary of English words used by the software's spelling checker is indexed by how the word sounds, rather than being indexed alphabetically. Thus, to find phonetic matches, Translation Magic performs a set of steps. First, all of the possible phonetic variations of the individual stenographic strokes—not all of the possible spellings—are found. For example, the stroke TPHOGS breaks down into TPH, O, and GS, each of which has many correct corresponding spellings. TPH, for example, can be spelled "n," "gn," "kn," "en," or "in" according to steno-to-English theory. Phonetically, however, there are only two distinct variations: N and *N, where * is any vowel sound. Similarly, GS can be spelled gs, ings, tion, sion, shion, tial, cial or shal. But, phonetically, this entry breaks down to only a few distinct phonetic variations: KS, NS, XN, XL (where K represents either a hard K or G sound, N represents either N or NG sounds, and X represents the soft "sh" or "ch" sound. Again, there are less phonetic variations than spelling variations. Finally, O can be spelled any of a dozen ways. Thus, the enormous variation in vowel sounds makes it desirable to eliminate vowels entirely from the phonetic profiles of words in the spelling dictionary (except when a vowel sound starts the word).

Next, Translation Magic looks up all words in the spelling dictionary that fit all of the possible phonetic profiles. For example, the above stroke can have only eight different phonetic profiles (instead of over a hundred different spellings). These profiles include:

NKS;
 NNS;
 NXN;
 NXL;
 *NKS;
 *NNS;
 *NXN; and
 *NXL.

The profile is likely to produce many possible matches, such as knocks, nags, noons, notion, inks, innings, inaction, initial, etc.

The process continues by analyzing all of the results returned by the spelling checker to determine which ones fit the possible spellings in the stenographic phonetics table and grades the results according to matches, non-matches, and preference for particular spellings (the short "i" sound is more likely to be spelled "i" than "y," even though both are acceptable). The best matches for this exemplary stroke are likely "notion" and "nogs." Accordingly, these matches are determined and graded by examining a user-maintainable list of stenographic key sequences and their possible spelling variations, such as:

TPH=n, gn, kn, en, in
 O=o, ou, ough
 GS=gs, ings, tion, sion, shion, cial, tial, shal It becomes apparent to the program that the entry TPHEUGS (EU=i) produces the two words "innings" and "initial" among its strongest matches. Thus, TM selects one of these two words that is the closest and that makes the most sense in the context of the sentence. If desired, the stenographer can record the selection within the dynamic dictionary to make future translations easier and more automatic.

The Translation Magic algorithm temporarily creates phonetic profiles on the fly as it looks up words in the dictionary. TM is able to use multiple strokes to create the phonetic profiles, and, by doing so, the possible number of matches in the spelling dictionary shrinks dramatically. That means that it becomes very easy (in a processing sense) for the algorithm to find long words. More specifically, TM looks for long sequences of strokes when attempting to find phonetic matches. For example, the only word in the spelling dictionary that matches the phonetic profile RFRKRTT is the word "refrigerated." This example illustrates that matching a long sequence of strokes is actually easier for TM than matching a short sequence of strokes, making the process of matching long words easier for the software (to help make up for the fact that longer words are considerably more difficult for the stenographer to write).

The phonetic matching algorithm according to the present invention starts by searching for the shortest possible match. The algorithm not only gathers matches, it also finds other entries in the spelling dictionary that are longer and/or start with the same phonetic sequence. If longer matches do exist, the process adds the next stroke in the longer match and repeats the finding process. The algorithm continues this iterative process until there are no more matches left before it compares and evaluates the results. The ability to detect if there are longer word matches is also important when translating in real-time. Thus, the system is able to wait for more strokes, if necessary, rather than prematurely translating what the user has written so far.

Checking approximate matches with the present invention enhances the translation performance over prior art transcription processes but this enhancement has the drawback of slowing down the translation process. Prior art CAT systems translate extraordinarily fast because they just look up entries in a table. TM, on the other hand, is performing a large number of calculations in selecting the best match; in other words, improvement in accuracy is exchanged for a decrease in translation speed. TM employs its algorithm to narrow down the search space and, by doing so, insures that the process is not too slow to be usable.

Stenographers' dictionaries typically contain anywhere from 20,000 to over 200,000 entries, and searching the entire dictionary for approximate matches would take prohibitively long. The dictionary is a linear data structure, but is sorted by the stenographic strokes in the entries, which makes it extremely quick to find matches for a particular stenographic stroke using a binary search. Searching for approximate matches, however, has not been done in the past. The following steps describe one exemplary embodiment of the approximate matching algorithm of the present invention.

Given a sequence of strokes, all of the possible ways that a single key could be added or taken away from the beginning of the sequence is determined and a search for indices of these results is performed. Also included is the index of an untouched entry. A list of these indices is created. For example, if the stenographer is attempting to translate TPAR/PHRA/SAOE, a search for TPAR, STPAR, PAR, TKPAR, TAR, etc. is performed. (It is noted that the stenographic keyboard is: STKPWHRAO*EUFRPBLGTSDZ.)

A keystroke distance is set and defined as "N". For each of the indices in the list, any that are within N distance of each other are discarded. For each of the remaining indices, every entry within N distance of the indices is evaluated. These first steps create a sequence of bracketed ranges that will usually contain all of the possible mis-strokes for the entry being evaluated. It is not necessary to test every possible mis-stroke, all that is needed is to find areas in the dictionary where there are likely to be approximate matches.

The fitness of the approximate matches is created by counting a degree of error, weighted according to certain details. Keys that are accidentally pressed and are unnecessary are given a smaller weight. Keys that were not pressed that should have been pressed are given a larger weight and, therefore, constitute a larger error. For example, if the stenographer wrote TKPOR, it is a better match for TPOR than TKPORD. The primary reason for this is that a missed key could, theoretically, be replaced by anything, requiring a greater degree of assumption by the program, whereas an extra key is conspicuous, for example, a dragged key. Another weighting factor is how close the extra or missing key is to the keys that were actually pressed. It is more likely that a stenographer will accidentally brush against an extra key next to the one they were supposed to hit than it is for them to accidentally hit a key clear across the keyboard.

The total error is, then, divided by the total average number of keys in the entry to give an error-per-key grade. A list is created containing only those entries that are below a predefined error threshold. Then, the length, frequency of use, and contextual fitness is factored in to arrive with a best approximate match.

Referring now to the single FIGURE of the drawing, there is shown a flow diagram of a first exemplary process for carrying out the optimized translation program of the present invention. In Step 100, a sequence of stenographic strokes is collected and, in Step 200, a table of translations is created for these strokes by looking up what words are in the existing steno-to-text dictionaries for these specific strokes. A grade (or score) is assigned to each of these strokes in sequence in Step 300 according to a frequency of use and a contextual fit within a given sentence. In Step 400, alternate translations (phonetics and approximate matches) that start with the first stroke in the transcribed sequence are searched and determined.

Step 410 indicates one exemplary process for finding alternate translations by finding alternate phonetic translations. First, all of the possible phonetic variations of the individual stenographic strokes are found. A look up is performed to find all words in the dictionary that fit all possible phonetic profiles for the sequence of stenographic strokes. All results returned by the spell-checker are analyzed to determine which results fit possible spellings in the stenographic phonetics table and the results are graded according to matches, non-matches, and preference for particular spellings. If any entries in the spelling dictionary are found that begin with the sequence under consideration, the process is aborted entirely and returned immediately to Step 100 to add more strokes to the sequence because there exists the possibility of a longer match. Best matches are determined and are graded by examining a user-maintainable list of stenographic key sequences and their possible spelling variations, such as, for example:

TPH=n, gn, kn, en, in
O=o, ou, ough
GS=gs, ings, tion, sion, shion, cial, tial, shal Variables are factored in the grading including, for example, length, level of error, and contextual fitness to produce a best phonetic fit.

Step 420 indicates another exemplary process for finding alternate translations by finding all possible mis-strokes for the current sequence of stenographic strokes. This step is performed in addition to Step 410. Given a sequence of strokes, all of the possible ways that a single key could be added or taken away from the beginning of the sequence is determined and a search for indices of these results is performed. Also included is an index of an untouched entry. A list of these indices is created. A maximum distance (N) is set between dictionary entries to be examined and each of the indices in the list that are within N distance of each one another is discarded. For each remaining index, every entry within N distance of the indices is evaluated to create a sequence of bracketed ranges that contains possible misstrokes for the entry being evaluated. Fitness of an approximate match is determined by counting a degree of error, weighted according to the following:

Keys accidentally pressed and unnecessary=smaller weight (better score, more desirable);
    Keys not pressed that should have been pressed=larger weight (worse score, less desirable);
    How close the extra or missing key is to the keys that were actually pressed
        =smaller weight for keys nearer to one on the keyboard that was supposed to be hit and
        =larger weight for keys farther from the desired keys.

The total error is divided by the total average number of keys in the entry to give an error-per-key grade. If an entry is found in the dictionary that starts with the sequence of stenographic strokes under consideration and that is within an acceptable error threshold, the process returns immediately to Step 100 to add more strokes to the sequence—because a longer match might be possible. A list containing only the entries below a predefined error threshold is created and the following characteristics are factored in to produce a best approximate match: length; level of error; frequency of use; and contextual fitness.

In Step 500, a translation result with best score is selected. The selection includes three options:
the original translation as recorded in Step 200;
the possible phonetic replacement; and
the possible approximate match.
The translation that will be used is that translation result having the best score.

In Step 600, strokes translated from the beginning of the list of strokes are removed and more strokes are added to the end of the list, if necessary. Then, the process returns to Step 100 for additional stenographic translation.

The translation functions described herein can be performed by any suitably configured processing system adapted to implement an exemplary embodiment of the present invention. The processor can be coupled to a memory useful for, for example, storing computer programs (also called computer control logic). Such computer programs, when executed, enable the processor to perform the features of the present invention as discussed herein.

In addition to a memory, computer programs may also be embedded in a computer program product, or computer readable medium, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

The computer readable medium may include non-volatile memory, such as ROM, flash memory, disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The foregoing description and accompanying drawings illustrate the principles, preferred embodiments and modes of operation of the invention. More specifically, a process for translating machine shorthand into text according to the present invention has been described with respect to a stenographic machines. However, the invention should not be construed as being limited to the particular embodiments discussed above. Additional variations of the embodiments discussed above will be appreciated by those skilled in the art as also applicable to other translation applications.

The above-described embodiments should be regarded as illustrative rather than restrictive. Accordingly, it should be appreciated that variations to those embodiments can be made by those skilled in the art without departing from the scope of the invention as defined by the following claims.

I claim:

1. A method for translating stenographic strokes, the method comprising:
    receiving a series of stenographic strokes on a stenographic keyboard;
    creating a table of translations of one or more strokes within the series of strokes;
    sequentially assigning a score to each of the one or more strokes;
    determining at least one alternate translation to at least one of the translations in the table of translations by;
        determining a number of possible ways a single key could be one of added to and taken away from a beginning of the series of stenographic strokes, each of the possible ways corresponding to a dictionary entry in a steno-to-text dictionary having a plurality of dictionary entries, each dictionary entry having an index associated therewith;
        locating in the steno-to-text dictionary each dictionary entry corresponding with each of the determined possible ways;
        creating a list of the indices associated with the located dictionary entries;
        including an index of an untouched entry in the list of the indices;
        setting a maximum physical key distance N between the indices of the located dictionary entries to be examined;
        examining at least one index in the list of indices and discarding each of the indices in the list of indices that is within the distance N of the at least one index;
        for each of the non-discarded indices of the list of indices, locating dictionary entries in the steno-to-text dictionary having an index within N distance of the non-discarded index;
        evaluating the dictionary entries associated with the non-discarded indices and evaluating the located dictionary entries associated with the indices within the distance N of the non-discarded indices;

creating a sequence of ranges that contain potential mis-strokes for the dictionary entry being evaluated; and
determining an appropriateness of a match to a word in the steno-to-text dictionary by counting a degree of error;
ranking the translations and alternate translations based on an accumulation of the score of the strokes within; and
selecting at least one of:
one of the ranked translations; and
one of the ranked alternate translations,
based on a best score.

2. The method according to claim 1, wherein the creating a table of translations comprises:
locating words in a steno-to-text dictionary that correspond to the series of strokes.

3. The method according to claim 1, wherein:
the assigning a score is according to at least one of:
a frequency of use; and
a contextual fit within a sentence.

4. The method according to claim 1, wherein the determining alternate translation comprises:
determining at least one phonetic profile of the series of strokes; and
locating at least one word in a steno-to-text dictionary that corresponds to the at least one phonetic profile.

5. The method according to claim 4, wherein:
the at least one word located has a letter matching a first stroke of the received series of strokes.

6. The method according to claim 1, further comprising:
removing the selection from the series of strokes; and
repeating the creating step starting from a first of a series of remaining strokes.

7. The method according to claim 1, further comprising:
determining at least one phonetic variation of individual ones of the stenographic strokes;
determining all words in a steno-to-text dictionary that fit the variations for the series of stenographic strokes;
comparing the determined words to contents of a steno-graphic phonetics table; and
assigning a score to each comparison.

8. The method according to claim 1, wherein the step of determining an appropriateness of a match comprises:
comparing the sequence of ranges containing potential mis-strokes with the beginning of the series of stenographic strokes received on the stenographic keyboard to determine whether keys could have been one of unnecessarily added to and inadvertently not added to the beginning of the series of stenographic strokes, the unnecessarily added keys being keys that were accidentally pressed, the inadvertently not added keys being keys that were not pressed but should have been pressed; and
if it is determined that keys were unnecessarily added to the beginning of the series of stenographic strokes, the method further comprises:
assigning a first weight to unnecessarily added keys that are relatively proximate a target key; and
assigning a second weight, greater than the first weight, to unnecessarily added keys that are relatively distant from the target key; and
if it is determined that keys were inadvertently not added to the beginning of the series of stenographic strokes, the method further comprises assigning the second weight to the keys inadvertently not added, the first weight being more desirable than the second weight.

9. A stenographic device, comprising:
a stenographic keyboard including a plurality of keys operable to receive a series of stenographic strokes; and
a processor operable to:
create a table of translations of one or more strokes within the series of strokes;
sequentially assign a score to each of the one or more strokes;
determine at least one alternate translation to at least one of the translations in the table of translations by;
determining a number of possible ways a single key could be one of added to and taken away from a beginning of the series of stenographic strokes, each of the possible ways corresponding to a dictionary entry in a steno-to-text dictionary having a plurality of dictionary entries, each dictionary entry having an index associated therewith;
locating in the steno-to-text dictionary each dictionary entry corresponding with each of the determined possible ways;
creating a list of the indices associated with the located dictionary entries;
including an index of an untouched entry in the list of the indices;
setting a maximum physical key distance N between the indices of the located dictionary entries to be examined;
examining at least one index in the list of indices and discard each of the indices in the list of indices that is within the distance N of the at least one index;
locating dictionary entries in the steno-to-text dictionary having an index within N distance of each of the non-discarded indices;
evaluating the dictionary entries associated with the non-discarded indices and evaluate the located dictionary entries associate with the indices within the distance N of the non-discarded indices;
creating a sequence of ranges that contain potential mis-strokes for the dictionary entry being evaluated; and
determining an appropriateness of a match to a word in the steno-to-text dictionary by counting a degree of error to determine the at least one alternate translation;
rank the translations and alternate translations based on an accumulation of the score of the strokes within; and
select at least one of:
one of the ranked translations; and
one of the ranked alternate translations,
based on a best score.

10. The stenographic device according to claim 9, wherein the processor is operable to:
locate words in a steno-to-text dictionary that correspond to the series of strokes to create the table of translations.

11. The stenographic device according to claim 9, wherein the processor is operable to:
assign the score according to at least one of:
a frequency of use; and
a contextual fit within a sentence.

12. The stenographic device according to claim 9, wherein the processor is operable to:
determine at least one phonetic profile of the series of strokes; and
locate at least one word in a steno-to-text dictionary that corresponds to the at least one phonetic profile to determine the at least one alternate translation.

13. The stenographic device according to claim 12, wherein:
   the at least one word located has a letter matching a first stroke of the received series of strokes.

14. The stenographic device according to claim 9, wherein the processor is further operable to:
   remove the selection from the series of strokes; and
   create another table starting from a first of a series of remaining strokes.

15. The stenographic device according to claim 9, wherein the processor is further operable to:
   determine at least one phonetic variation of individual ones of the stenographic strokes;
   determine all words in a steno-to-text dictionary that fit the variations for the series of stenographic strokes;
   compare the determined words to contents of a stenographic phonetics table; and
   assign a score to each comparison.

16. The stenographic device according to claim 9, wherein the processor is further operable to:
   compare the sequence of ranges containing potential misstrokes with the beginning of the series of stenographic strokes received on the stenographic keyboard to determine whether keys could have been one of unnecessarily added to and inadvertently not added to the beginning of the series of stenographic strokes, the unnecessarily added keys being keys that were accidentally pressed, the inadvertently not added keys being keys that were not pressed but should have been pressed; and
   if it is determined that keys were unnecessarily added to the beginning of the series of stenographic strokes, the processor is operable to:
      assign a first weight to unnecessarily added keys that are relatively proximate a target key; and
      assign a second weight, greater than the first weight, to unnecessarily added keys that are relatively distant from the target key; and
   if it is determined that keys were inadvertently not added to the beginning of the series of stenographic strokes, the processor is operable to assign the second weight to the keys inadvertently not added,
   wherein the first weight is more desirable than the second weight.

* * * * *